United States Patent
Clements et al.

(10) Patent No.: US 8,181,555 B2
(45) Date of Patent: May 22, 2012

(54) MACHINE FOR BORING, TURNING, AND FACE GROOVING

(75) Inventors: Timothy S. Clements, McMinnville, OR (US); David Loyd Sorensen, Sherwood, OR (US); David M. Briggs, Newberg, OR (US)

(73) Assignee: Climax Portable Machine Tools, Inc., Newberg, OR (US)

( * ) Notice: Subject to any disclaimer, the term of this patent is extended or adjusted under 35 U.S.C. 154(b) by 1682 days.

(21) Appl. No.: 11/696,045

(22) Filed: Apr. 3, 2007

(65) Prior Publication Data
US 2009/0324350 A1    Dec. 31, 2009

(51) Int. Cl.
*B23B 3/04*    (2006.01)
*B23B 5/14*    (2006.01)

(52) U.S. Cl. ...................................... 82/70.2

(58) Field of Classification Search ............ 82/117, 82/1.11, 70.2, 72, 73, 74; 29/889.2; 408/103
See application file for complete search history.

(56) References Cited

U.S. PATENT DOCUMENTS

| | | | |
|---|---|---|---|
| 4,400,859 A * | 8/1983 | Woythal et al. | 29/27 C |
| 4,945,792 A * | 8/1990 | Gardner | 82/1.2 |
| 6,786,118 B1 * | 9/2004 | Lumm et al. | 82/70.2 |
| 2003/0147741 A1* | 8/2003 | Coppola | 415/115 |
| 2009/0324350 A1* | 12/2009 | Clements et al. | 408/103 |
| 2010/0202841 A1* | 8/2010 | Backhouse | 408/3 |

* cited by examiner

*Primary Examiner* — Will Fridie, Jr.
(74) *Attorney, Agent, or Firm* — Dascenzo Intellectual Property Law, P.C.

(57) ABSTRACT

Embodiments of the present invention provide a machining tool including two spaced apart flange members adapted to be coupled with a turbine rotor while the rotor is in a first portion of a turbine casing. A carousel may be coupled to the flange members and adapted to rotate relative to the flange members, and adapted to couple with a cutting tool to complete a machining operation. Position of the cutting tool may be sensed and information on the position may be transmitted wirelessly to an operator readable display.

39 Claims, 8 Drawing Sheets

MACHINE FOR BORING, TURNING, AND FACE GROOVING

TECHNICAL FIELD

Embodiments of the present invention relate to the field of machine tools, more specifically, to a boring tool adapted to machine the inside of a turbine casing without requiring removal of the turbine rotor.

BACKGROUND

A turbine, for example a gas or steam turbine, typically includes a turbine casing with a rotor journaled for rotation therein. A number of turbine blades can be mounted on the rotor. The turbine casing typically includes curved inner surfaces adjacent the periphery of the turbine blades, called rows. Occasionally the rows may require machining as part of a repair or refurbishment operation. Three different types of cuts may be required to completely machine each row. A radial cut, a longitudinal cut (sometimes called a turning cut), and a hook, or face grooving (sometimes called trepanning).

Currently, to gain access to the surface of the rows to be machined requires removing the top portion of the turbine casing, then removing the rotor. Removing the rotor from the turbine casing can be difficult. Further, the top portion of the casing may splay slightly when uncoupled to the lower portion of the casing, which in turn requires a special asymmetrical machining operation to machine the rows in the top portion.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

FIG. 12 is a partially exploded perspective view.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)." For the purposes of the present invention, the phrase "(A)B" means "(B) or (AB)," that is, A is an optional element.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

The description may use the phrases "in various embodiments," or "various embodiments," or "in an embodiment," or "in embodiments," which may each refer to one or more of the same or different embodiments. Furthermore, the terms "comprising," "including," "having," and the like, as used with respect to embodiments of the present invention, are synonymous.

Various embodiments may provide an apparatus which may be used for machining the inside of a turbine casing. In various embodiments the apparatus may be secured to the turbine rotor, while the rotor is in at least a portion of the turbine casing. In various other embodiments the apparatus may be secured to and within the same, or another, portion of the turbine casing, and the rotor may be removed. In various embodiments the apparatus may be secured at two spaced apart locations along the axis of the turbine casing. The locations may be sufficiently spaced to provide an area on the apparatus to support one or more machining tool configurations. The locations may also be sufficiently spaced to enable a large area as measured axially, and/or a number of locations (e.g. rows) spaced apart along the turbine casing axis to be machined without moving the apparatus. In addition, various embodiments may provide sufficient structural rigidity to the apparatus to make the apparatus suitable for various machining tasks.

Figure 1:
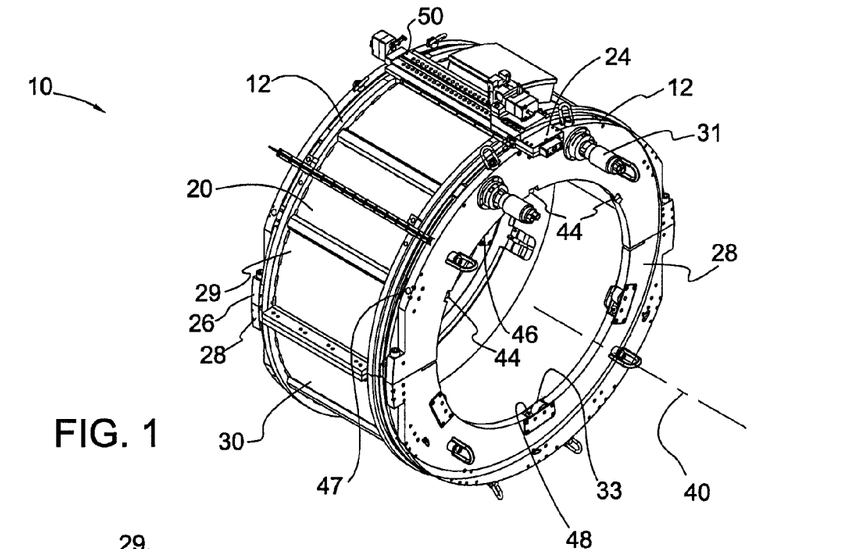
FIG. 1 is a perspective view illustrating various embodiments in accordance with the invention.
Figure 2:
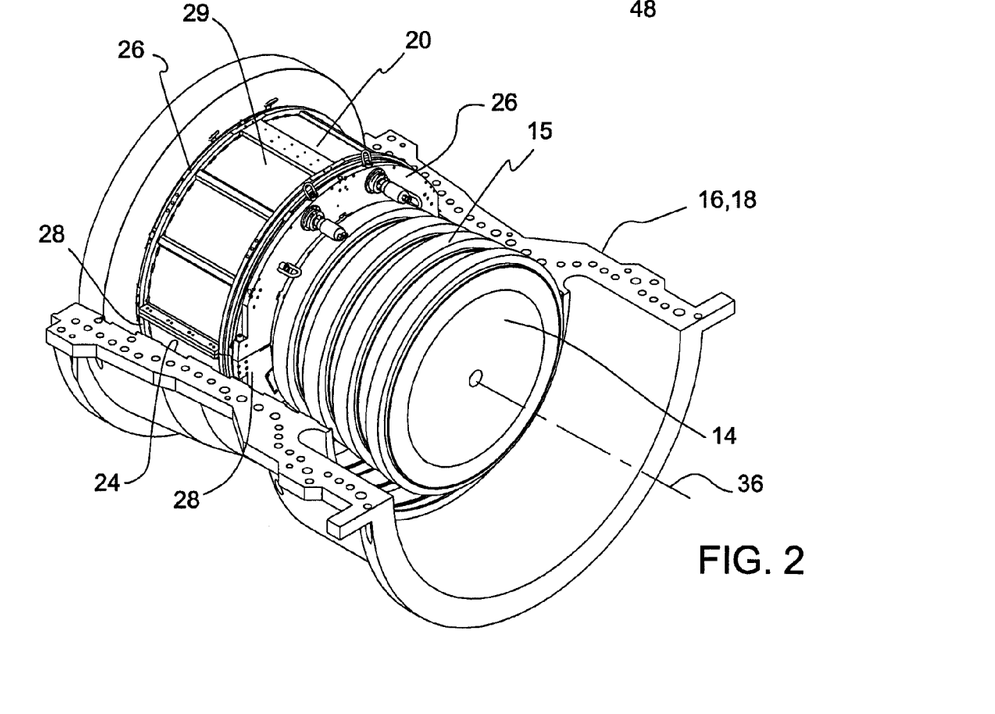
FIG. 2 illustrates various implementations of various embodiments in accordance with the invention.

FIG. 1 is a perspective view illustrating various embodiments according to the invention, and FIG. 2 illustrates at least one of various implementations of the embodiment illustrated in FIG. 1. A tool 10 may include two spaced-apart flange members 12, and may be adapted to be coupled with a rotor 14, for example, a turbine rotor while the rotor 14 is in a first portion 16 of a turbine casing 18. A carousel 20 may be coupled with the flange members 12, and may be adapted to rotate relative to the flange members 12. A cutting tool (not shown) may be adapted to be coupled with the carousel 20 and may be adapted to contact an inside surface 24 of the first portion 16 of the turbine casing 18. In various embodiments, the cutting tool may be further adapted to move laterally generally across a part or all of the carousel 20. This may allow the cutter to machine more than one row without repositioning the tool 10, as is required in current turbine machining systems. The rotor 14 is illustrated with turbine blades removed from each of a number of blade supports 15.

In various embodiments each of the two flange members 12 may include top flanges 26 and bottom flanges 28. The bottom flanges 28 may be adapted to be placed between the rotor 14 and the first portion 16 of the turbine casing 18. The top flanges 26 may be adapted to be coupled with the bottom flanges 28. Similarly, the carousel 20 may have a top portion 29 and a bottom portion 30 adapted to be coupled together. In various embodiments, one or more motors 31 may be located on the top flange 26 and may be adapted to effect rotation of the carousel 20 within flanges 12.

Figure 3A:
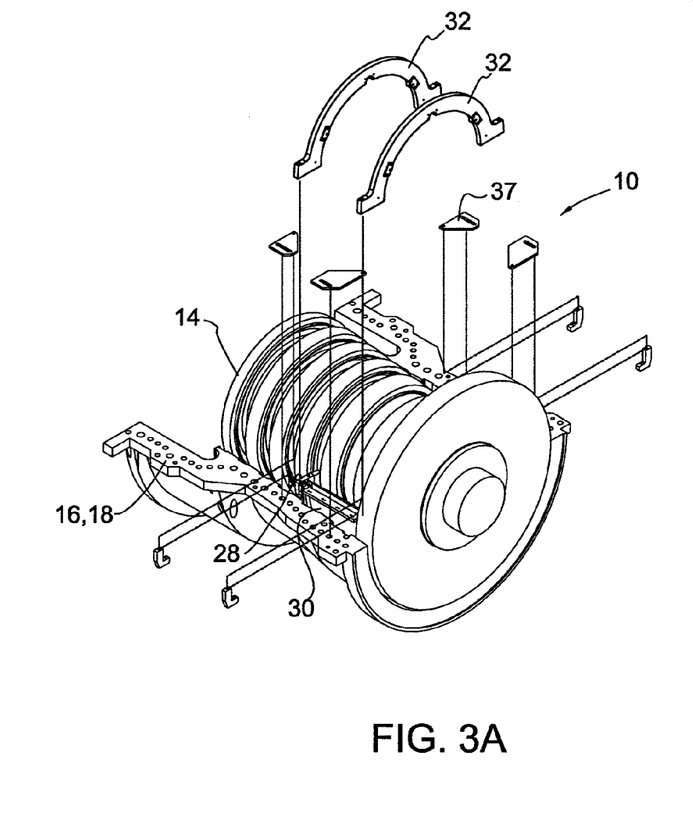
FIG. 3A is a partially exploded perspective view and FIG. 3B is a top view illustrating various embodiments in accordance with the invention.
Figure 3B:
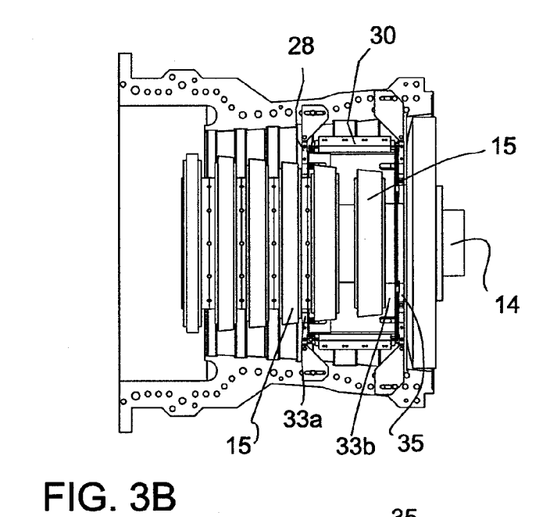

FIG. 3A is a partially exploded perspective view and FIG. 3B is a top view illustrating various operations that may be conducted to at least partially construct and/or position boring tools in accordance with various embodiments according to the invention. Various embodiments may utilize supports, which are referred to herein as strong backs 32 which may be temporarily coupled with the bottom flanges 28 during assembly of the tool 10 for operation. In one embodiment, the strong backs 32 may be positioned between the rotor 14 and the first portion 16. The bottom flanges 28 and bottom carousel portion 30 (making up the lower half of tool 10), may be secured to the strong backs 32. The lower portion may then be rotated around the rotor such that the bottom portion is between the rotor and the lower portion of the turbine casing. In one embodiment cam rollers 33 (FIG. 1) may contact a clamp collar 35 (FIG. 3C, and discussed herein below) and the rotor 14, and may help facilitate repositioning the tool 10.

In various embodiments, with the lower half positioned between the first portion 16 of the turbine casing 18 and the rotor 14, rigging members 37 may be used to temporarily support the lower half and the strong backs 32 may be removed. Anti-rotation pins (not shown) may also be utilized in part to help hold the lower half in place until the upper half is secured to the lower half completing tool 10 assembly. After the bottom portion 30 and the flanges 28 (i.e. the lower half) are in position, the strong backs 32 may be removed. Top flanges 26 (FIG. 2) may be put in place and coupled with the bottom flanges 28. The top portion 29 (FIG. 2) of the carousel 20 may be placed over the turbine rotor 14 and coupled with the bottom portion 30 of the carousel 20, such that the carousel 20 is positioned for rotation within the flanges 12.

Figure 3C:
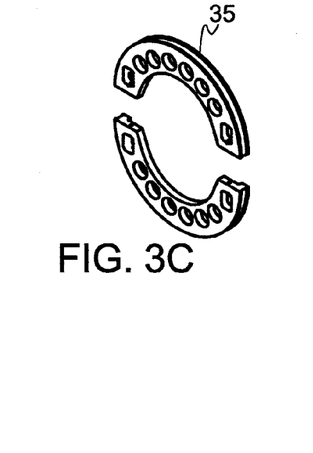
FIG. 3C illustrates a perspective view of a clamp collar in accordance with various embodiments of the present invention.

As may be best shown in FIG. 3B, in various embodiments, the flanges 28 and 26 (not shown) may couple with the rotor 14 between the blade supports 15, for example within spaces 33a and 33b. In the illustrated example embodiment, the diameter of space 33b may be smaller than the diameter of space 33a. A clamp collar 35 may be used to compensate for the difference. FIG. 3C is an exploded perspective view of a clamp collar 35 according to various embodiments of the invention and may be adapted to fit on the rotor 14 within space 33b, which may help in the coupling procedure.

Figure 4A:
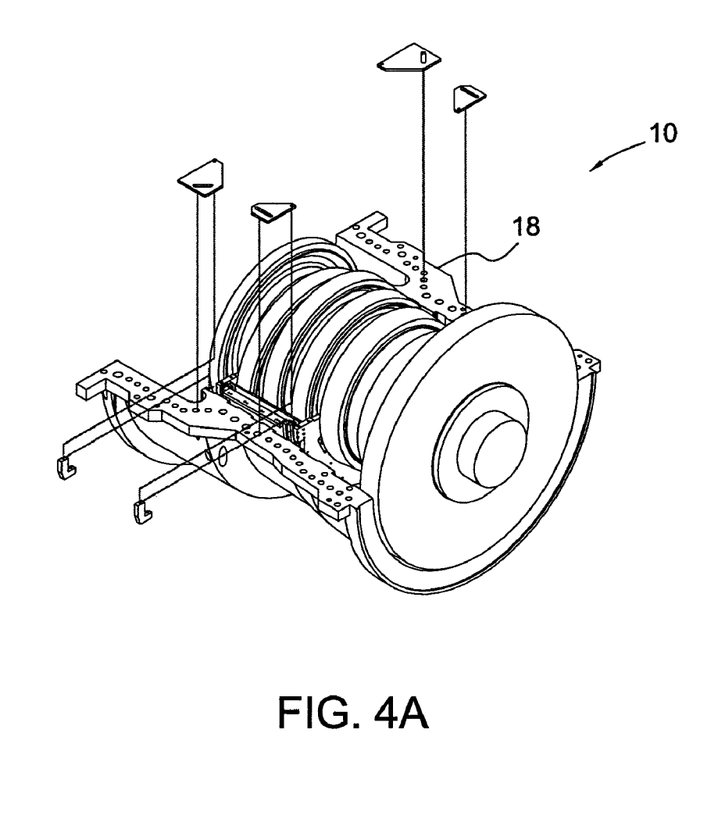
FIGS. 4A and 4B are respective perspective and top views illustrating various embodiments in accordance with the invention.
Figure 4B:
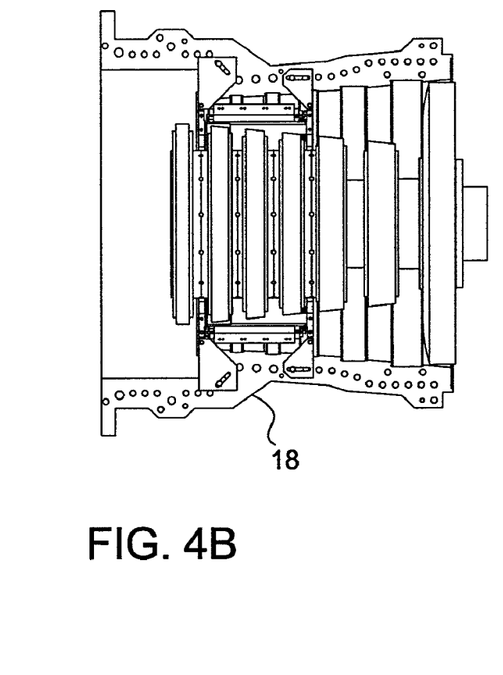

FIGS. 4A and 4B are respective perspective and top views similar to FIGS. 3A and 3B illustrating various embodiments wherein a tool 10 is located in a different area within the turbine casing 18. The tool 10 may be installed for machining different rows of the turbine casing 18, by simply installing or reinstalling the tool at different locations within the turbine casing 18. The inner diameter of the rows may vary along the axis of the turbine casing 18. Various embodiments according to the invention may be sufficiently versatile to machine each row either independently or simultaneously. Examples of how this may be accomplished is discussed herein below.

Returning to FIGS. 1 and 2, the first portion 16 of the turbine casing 18 may have central axis 36. In various embodiments the carousel 20 may be adapted to rotate about a machining axis 40. In various embodiments the machining axis 40 may be coincident with the central axis 36, although in other embodiments, it may be non-coincident therewith. The machining axis 40 may be determined and/or selected by an operator, or some other selection process. The tool 10 may include one or more adjustment features adapted to be actuated by an operator to adjust the location of the machining axis 40.

For example, in various embodiments, the adjustment features may include two or more jacking feet 44 on each of the flange members 12 which may be adapted to contact the rotor. As illustrated in the example embodiment, three jacking feet 44 may protrude from an inner surface 46 of each of the top flanges 26. Each jacking foot 44 may be adjustably coupled to the top flanges 26 (e.g. threaded engagement), and may be adjustable by means of a tool (not shown) adapted to engage with an opposite end of each jacking foot 44 via access holes 47. Such adjustments can help locate the machining axis as desired.

Two or more clamping cylinders 48 (e.g. three), may be located on, or in, each bottom flange 28 which may be adapted to contact the rotor 14. The clamping cylinders 48 may be adapted to oppose forces applied by the jacking feet 44, and may function to clamp the tool 10 to the rotor 14. The clamping cylinders 48 may be actuated in a variety of ways, including, but not limited to hydraulic actuation and may press inwardly on the rotor between the blade supports 15. In various embodiments, various combinations and placements of the jacking feet 44 and clamping cylinders 48 may be used. Various actuation arrangements and methods may also be used, including mechanical, hydraulic, pneumatic, and the like.

Various embodiments may provide an axial mover disposed on the carousel which may enable one or more cutting tools to be placed and/or moved axially across the carousel. The axially mover may also be adapted to effect or facilitate movement of other cutting tools (e.g. a radial movement of one or more cutting tools. Other embodiments may use an axial mover to effect both axial and radial movement of one or more cutting tools. The axial mover may include various interacting elements. For example, one embodiment may include a carriage in sliding contact with a slide. In various embodiments, adjustment may be provided with lead screw, while in other embodiments movement may be urged though a variety of interfacing arremgnements, such as a rack and pinion arrangement, servo motors, piston and cylinder arrangements, and the like.

Figure 5:
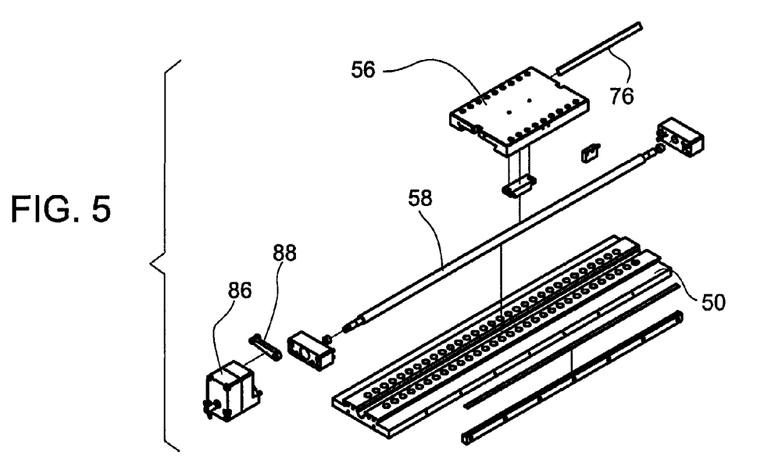
FIGS. 5 and 6 are exploded views illustrating selected elements of various embodiments in accordance with the invention.
Figure 6:
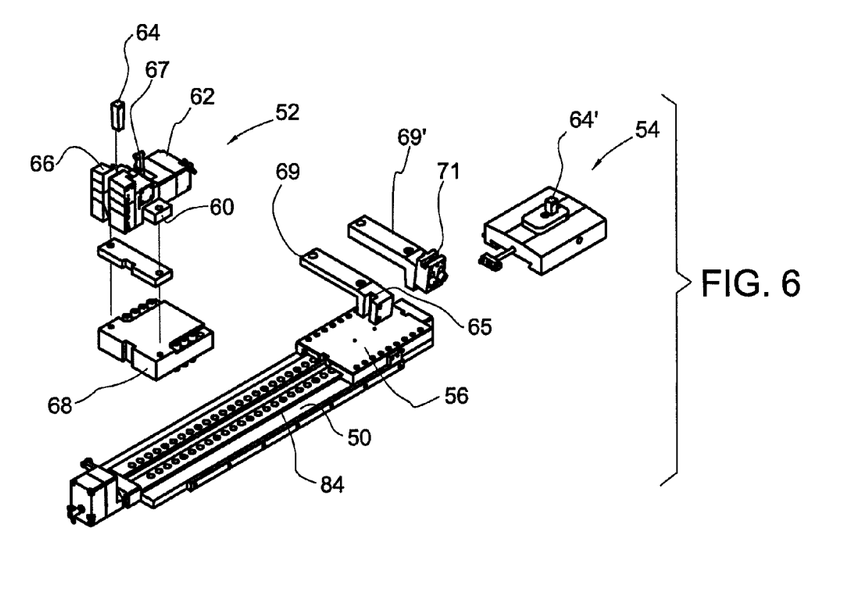

Various embodiments may include slide 50 which may be adapted to couple with the carousel 20, and be adapted to allow components to move axially relative to the slide 50 and carousel 20. FIGS. 5 and 6 are exploded views illustrating the example slide 50, and selected elements that may be adapted to work with the slide 50 according to various embodiments of the invention. The slide 50 may be adapted to support one or both of a first tool holding arrangement 52 which may be adapted to hold a first tool 64 a first distance from the carousel 20, and/or second tool holding arrangement 54 which may be adapted to hold a second tool 64' a second distance from the carousel.

A carriage 56 may be coupled with the slide 50, and may be adapted to move substantially axially relative to the central axis 36 of the turbine casing 18. The first tool holding arrangement 52 may be supported by the carriage 56, and adapted to move the first tool holding arrangement in an axial direction. In various embodiments, the carriage 56 may be also adapted to effect a radial movement of the second tool 64' on the second tool holding arrangement 54 by moving toward or away from the second tool holding arrangement 54. Movement of the carriage 56 on the slide 50 may be effected with a lead screw 58 that may be disposed, for example, along, and/or or within, the slide 50.

In embodiments wherein the slide 50 is adapted to support the first tool holding arrangement 52, the first tool holding arrangement 52 may include a holder base 60 coupled with a radial feed box 62. A first tool holder block 66 may be adapted to hold a first cutting tool 64, and may be adjustably supported by the base 60. The radial position of the tool holder block 66 and therefore the cutting tool 64 may be adjusted by the radial feed box 62. The radial feed box 62 may include elements adapted for such movement. For example a ratcheting mechanism (not shown) coupled with an actuating arm 67 may be set to advance or retract the tool holder block 66 and therefore the first tool 64, or to maintain the first tool 64 at a fixed radial position. Each rotation of the carousel 20 may bring the actuating arm 67 in contact with a trip arm (not shown) to effect the advancement or retraction of the first tool 64.

Figures 7, 8:
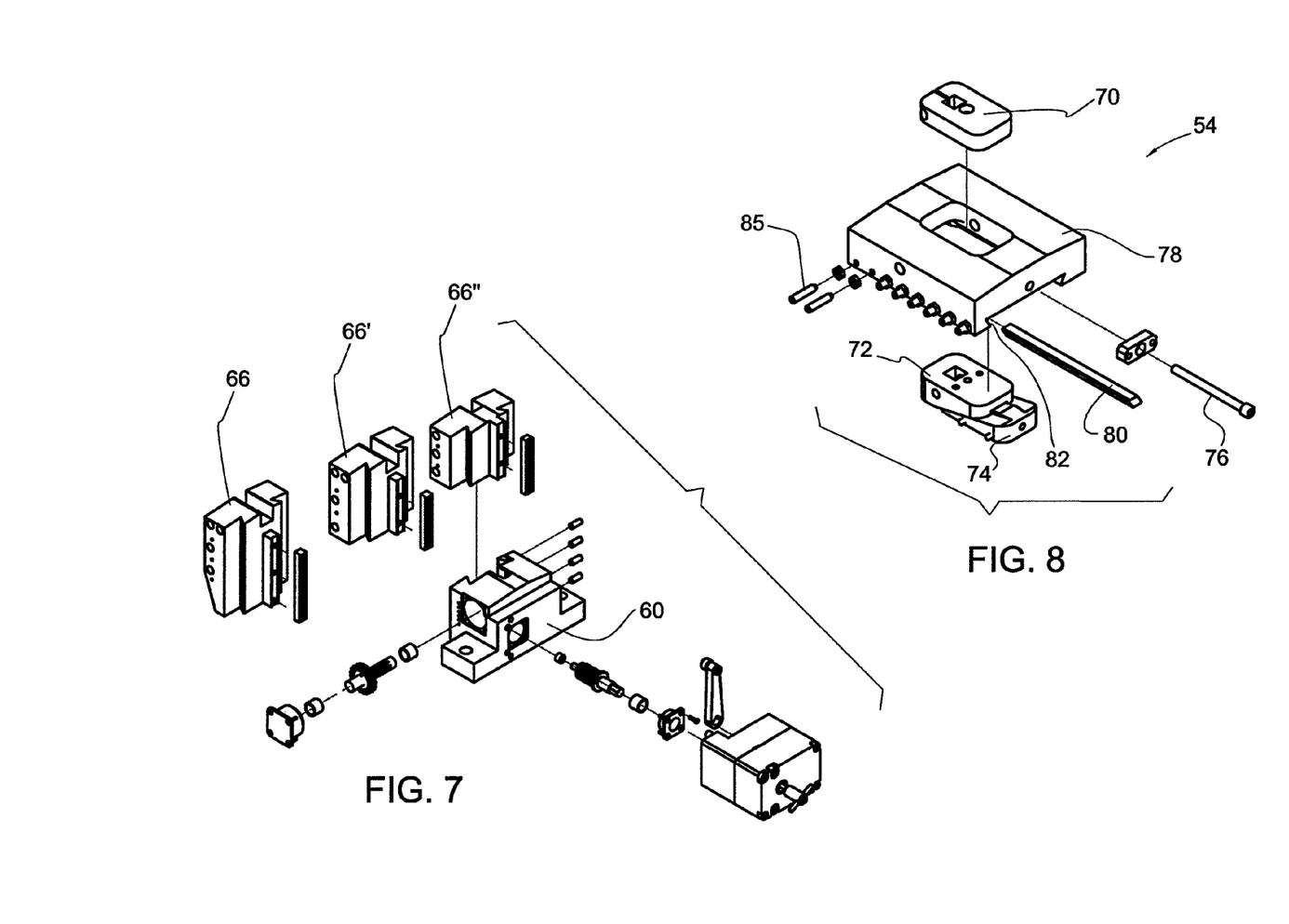
FIG. 7 is an exploded perspective view illustrating various embodiments in accordance with the invention.
FIG. 8 is an exploded perspective view illustrating selected elements of various embodiments in accordance with the invention.

In various embodiments, spacer blocks 68 of various sizes, dimensions and/or thicknesses may be used to support the tool holder block 66 and the radial feed box 62 at various levels. One spacer block 68 is illustrated for example purposes. In various embodiments various arrangements may be used to adjust the radial height of the first tool 64. As illustrated in FIG. 7 variously configured holder blocks 66, 66', 66" may also be used in addition to, or instead of, the spacer block 68, or blocks, to provide different predetermined levels of adjustment for the first tool 64. Further, in various embodiments, intermediate profile holder blocks 69 and 69' (FIG. 6) may be to provide additional predetermined levels at which to hold various tools.

The various cutting tool preset levels may be utilized to machine work pieces of various inner diameters, for example different rows in a turbine casing. One or both of the intermediate profile holder blocks 69 and 69' may include adjustment features that may allow for further vertical (radial) and/or horizontal movement of the cutting tool 64. For example, a groove 65 may be substantially vertical and adapted to adjustably retain a cutting tool/holder (not shown) for vertical adjustment. In addition to or instead of, the holder blocks 69 and 69' may have a substantially horizontal adjustment groove 71, adapted to adjustably hold a tool (not shown) for horizontal adjustment.

FIG. 8 is an exploded perspective view illustrating selected elements of the second tool holding arrangement 54. the second tool holding arrangement 54 may be particularly well suited for situations where there is a limited clearance between the carousel and the turbine casing, or in other situations where a lower profile may be required. In various embodiments, the carriage 56 may be adapted to effect a radial movement of a second cutting tool 64' coupled to a second tool holder 70 upon an axial movement of the carriage 56. Second tool holder 70, for example a low-profile tool holder, may be coupled to a first wedge member 72. Carriage 56 may be coupled to a second wedge member 74 via, for example, a rod 76. The first wedge member 72 and the second wedge member 74 may be co-disposed such that an axial movement of the second wedge member 74 may cause the radial movement of the first wedge member 72, via the carriage 56 and the rod 76, and in turn cause a radial movement of the low-profile tool holder 70.

A tool support 78 may be adapted to be coupled to the slide 50, and further adapted to house the first and second wedge members 72, 74. In various embodiments, the tool support 78 may span the lead screw and therefore avoid engagement therewith. A gib 80 may be positioned within one side of a dovetail cutout 82 on the tool support 78 and adapted to engage a corresponding dovetail cutout 84 (FIG. 6) on the slide 50. Screws 85 may be threadable engaged with the tool support 78 and adapted to bias the gib 80 against dovetail cutout 84 (FIG. 6) on the slide 50 to hold the tool support 78 in place.

Returning again to FIGS. 5 and 6, various embodiments according to the invention may include an axial mover adapted to axially advance or retract the carriage 56. In various embodiments, a feed box 86 having an actuating arm 88 may cause axial movement of carriage 56 along the slide 50 via a lead screw 58. A trip arm (not shown) may be coupled with a stationary object (not shown) and adapted to contact the actuating arm 88 to effect the axial advancement or retraction a preselected amount with each rotation of the carousel 20. In various embodiments, an axial feed box 86 may include all or some components that are the same or similar to components of radial feed box 62. In various embodiments, characteristics and/or operating conditions of the cutting tool such as position, temperature, or feed rate, or the like, may be sensed/detected and communicated to, for example, an operator via wireless communication. Various embodiments may include an apparatus having a main structure which may be moving relative to a stationary work piece. In one embodiment, for example, a carousel as shown and described may be rotating within the stationary flanges and/or about the rotor. In addition, a cutting tool may be moving relative to the main structure (e.g. axially and/or radially). The resultant movement of the cutting tool may thus be a compound movement relative to the stationary work. In many cases it is not practical for a cable or other hard wire connection to be employed to transmit information from an onboard sensor and a remote interface during machining operations due to physical obstructions or the machining operations themselves interrupting the path that a cable would have to be routed through. In addition a cable limits the ability of the operator to move freely around the work in progress as is necessary for monitoring and inspection of the work.

Various embodiments may enable tracking and display of a machine tool position with no physical cable linking the position sensor to the operator display. Communication of the position data may be achieved through the use of a wireless radio frequency link between the sensor and the operator display. In various embodiments the sensor may include an on board battery as a power source. This may also eliminate the need to provide power cabling. In various other embodiments the sensor may be powered from a hardwired power source or other means.

Various embodiments may provide a system that may include, for example, a position sensor and a transmitter located on the main rotating structure, and a remotely positioned receiver and operator display. The system may be configured to detect the position of the tool and transmit such positional information to the receiver, thus causing a display of positional information (e.g. a single axis of tool movement, or several axis simultaneously). As mentioned, other information may be sensed, transmitted, received and displayed.

In one embodiment, an apparatus may include a rotatable member adapted to be disposed for rotation within or about a work piece. A tool support may be coupled with the rotatable member and may be adapted to support a tool for rotation with the rotating member. A sensor or sensors may be coupled with the tool support and may be adapted to sense one or more operating conditions of the tool, such as position. A sending unit (e.g. a transmitter) may be coupled with the sensor(s) and may be adapted to receive information corresponding to the operating conditions. The sending unit may also be further adapted to send the information wirelessly to for example, a remote operator display fitted with a receiver.

Figure 9:
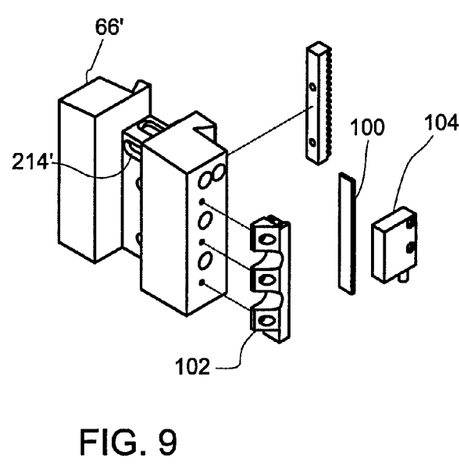
FIG. 9 is an exploded perspective view according to various embodiments in accordance with the invention.
Figure 10A:
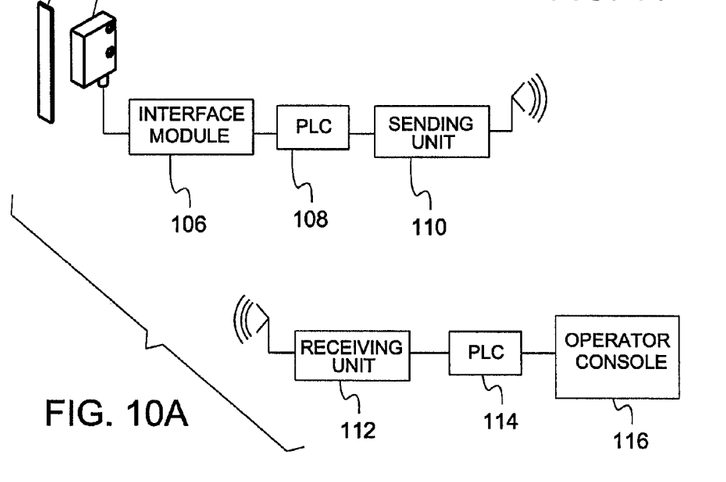
FIGS. 10A and 10B are block diagrams according to various embodiments in accordance with the invention.
Figure 10B:
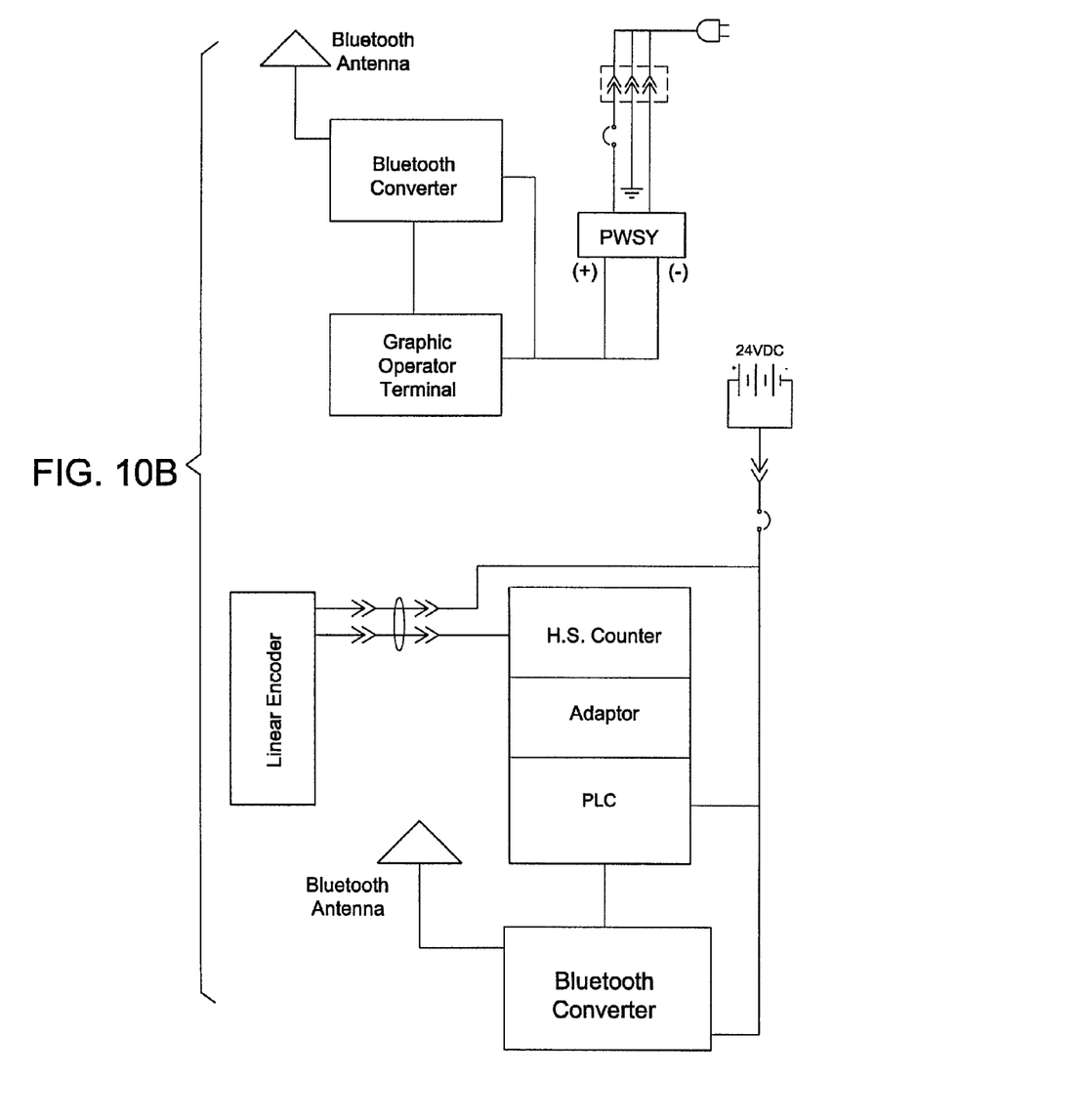

FIG. 9 is an exploded perspective view, and FIGS. 10A and 10B are block diagrams according to various embodiments of the invention. The sensor may include an indicating component, such as for example an encoded strip 100, which may be secured to a holder block 66' with for example an attachment element 102. The sensor may also include a detector 104 that may be secured to a relative stationary element, such as for example holder base 60 (FIG. 7), and be adapted to detect/read/sense movement of the indicating component, or as illustrated the encoded linear strip 100. The sensor may be for example, mechanical, optical, electrical, electromagnetic, magnetic, and/or like couplings.

In one embodiment (illustrated) a magnetic linear encoded strip 100 may be used for an indicator, which may include a plurality of magnetic "lines" disposed thereon. The sensor 104 may be adapted to "read" the lines. For example to read the number of lines that move past the sensor 104 when the holder block 66' moves relative to the holder base 60. In various embodiments, the sensor 104 may be coupled such that the sensed information on radial movement may be sent to an operator console via wireless communication network.

In various embodiments, the sensor 104 may be coupled to an interface module 106 (FIG. 10). The interface module 106 may be adapted to send information to a programmable logic controller (PLC) 108, which in turn may be adapted to send information wirelessly via a sending unit 110 to a receiving unit 112. Various communication protocols may be used including Bluetooth technology. The receiving unit 112 may be adapted to send information to a second PLC 114, which may in turn interpret the information and send it to an operator console 116 in a format that an operator can read. Said information may include a variety of information about the cutting tool, including, but not limited to tool position, temperature, wear characteristics, and the like. The operator console may have a display visible to an operator and adapted to display such information (e.g. tool position/movement). FIG. 10B illustrate various other embodiments. It can be appreciated that the wireless interface in accordance with various embodiments may be used on a variety of machining tools having a rotating machining head, and is not limited to the boring machine as set forth in the illustrated embodiments.

Figure 11:
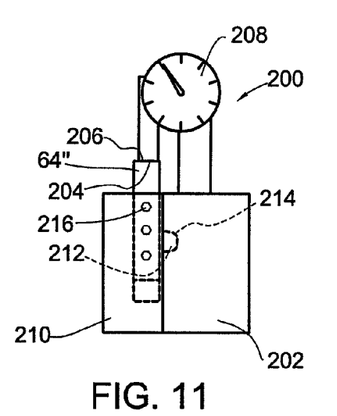
FIG. 11 is a side view illustrating an arrangement according to various embodiments in accordance with the invention.

In various embodiments, an interchangeable cartridge may carry the cutting tool and may be adapted for positional setting and/or calibration of the cutting tool with a separate device. This may allow for presetting the tool for a desired cut. The cartridge may also allow for a quick and easy tool change by simply swapping one cartridge for another. This may be helpful when a different cut is required and/or when a dull cutting tool needs to be replaced with a fresh or sharpened tool. With various embodiments the cutting tool may be positioned in a preselected position within the cartridge when beginning, or when continuing a cut. FIG. 11 is a side view illustrating an arrangement 200 that may be used as a calibration or measurement arrangement with various embodiments according to the invention. A cutting tool 64" may be coupled with a gauge block 202. A gauging surface 204 may be brought into contact with a top surface 206 of the cutting tool 64". An indication of the height of the top surface 206 may be shown on a gauge 208. The cutting tool 64" may be coupled to a tool cartridge 210. The tool cartridge 210 may have a first registration feature such as a protrusion 212 adapted to fit in a second registration feature such as an opening 214 on the gauge block 202. The cutting tool 64" may be adjustable within the tool cartridge 210. The position may be locked in place with one or more set screws 216.

The tool holder 66' (FIG. 9) may have a third registration feature adapted to interface with the first registration feature such that the cartridge 210 may be coupled to the tool holder 66' and the position of the cutting tool 64" may be preset for the desired cut. For example the tool holder may have an opening 214' sized and shaped similar to the opening 214 in gauge block 202, adapted to receive the protrusion 212 on the tool cartridge 210 such that relatively consistent position of the tool top surface may be achieved for the desired cutting operation.

Various embodiments according to the invention may be used to machine work pieces that do not include a rotor or other stationary object for with the machine can engage for support. For example, various embodiments may be used to machine a second portion of the turbine casing that has been separated from the first portion 16 as illustrated in FIG. 2, for example a top portion of the turbine casing 18.

Figure 12:
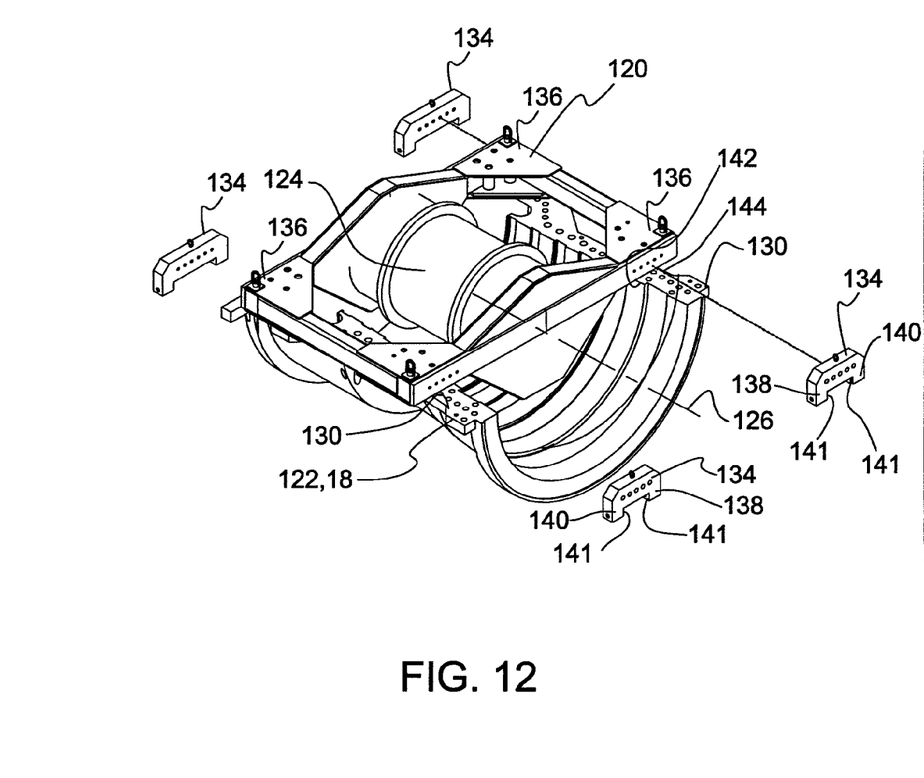
Figure 13:
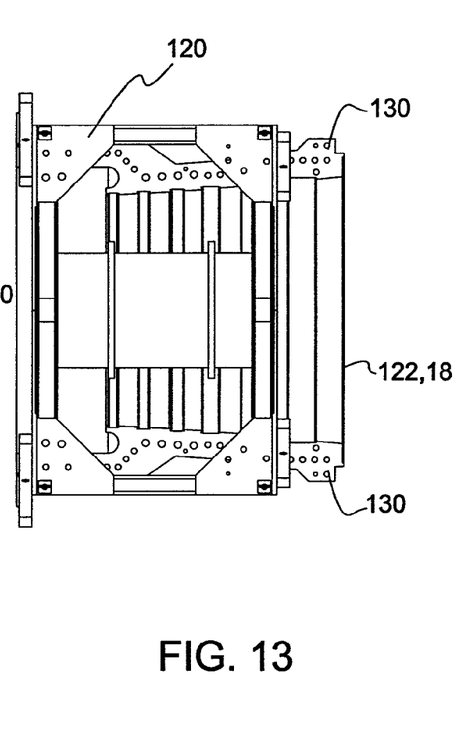
FIG. 13 is a top view according to various embodiments in accordance with the invention.

FIG. 12 is a partially exploded perspective view, and FIG. 13 is a top view according to various embodiments of the invention. A support fixture 120 may be adapted to couple with a second portion 122 of the turbine casing 18, the support fixture 120 may include a cylindrical member 124 which may be generally coaxial with a central axis 126 of the second portion of the turbine casing 18. The two spaced-apart flange members of the tool (not shown in this view) may be further adapted to couple with the cylindrical member 124 and to support the flanges and carousel for rotation about a machining axis. The adjustment features, for example the jacking feet, as illustrated and discussed earlier, may be adapted to be actuated by an operator to adjust the location of the machining axis. Again, the machining axis may or may not necessarily coincide with the central axis 126.

When the second portion 122 of the turbine casing 18 is separated from the first portion 16 of the turbine casing 18 the second portion 122 may tend to expand or contract, or otherwise contort due to residual stresses or for other reasons. In various embodiments the support fixture 120 may be adapted to couple with two spaced-apart mating surfaces 130 of the second portion 122 of the turbine casing 18. At least one pushing member, which may include, but not limited to jacking blocks 134 may be adapted to either push the mating surfaces 130 away from each other, or to push the mating surfaces 130 toward each other. Such movement may help urge the second portion of the turbine casing to establish the configuration it would maintain if it were secured to the lower/first portion of the casing 18.

For example, the support fixture 120 may be substantially rectangular, and may include four jacking blocks 134 generally located near each respective corner 136 of the support fixture 120. Each jacking block 134 may include first and second ears 138 and 140. Each ear 138,140 may include a pushing member 141 which may be adjustable relative the jacking blocks 134 via, for example, a threaded engagement. The pushing member 141 on the first ear 138 may be adapted to push on an inner surface 142 of the second portion of the turbine casing 18 and another pushing member 141 on the second ear 140 may be adapted to push on an outer surface 144 of the second portion 122 of the turbine casing 18 in the general area of one of the mating surfaces 130 to selectively shape the second portion 122 of the turbine casing 18. By selective adjustment of the pushing members 141 near each of the four corners 136 of the support fixture 120 the second portion 122 of the turbine casing may be reshaped as required.

Various embodiments may be adapted to have multiple tools coupled with a axial mover, for example a single slide on the carousel as described. Further, Various embodiments may include multiple axial movers, for example multiple slides coupled with the carousel. Each of the multiple slides may be coupled with multiple tools. For example, one embodiment may include a boring machine having a first and a second slide that may both be mounted on the carousel and adapted for rotation about an axis within the at least a portion of a turbine casing. The first and second slides may be respectively adapted to support a first and a third tool holder supported by respective first and second carriages. The first and second carriages may be adapted for axial movement along the respective first and second slides. The first and second slides may also, or instead, be adapted to respectively support a second and a fourth tool holder coupled with a first and a third wedge member, for example. A second and a fourth wedge member may be respectively in contact with the first and the third wedge members and may be adapted for axial movement which may be effected by the axial movement of the respective first and second carriages. The axial movement(s) may effect a radial movement of the second and fourth tool holders via the first and third wedge members.

Various embodiments according to the invention may be implemented using various methods according to the invention. The methods may include:

coupling two spaced-apart flange members with a turbine rotor while the rotor is in a first portion of a turbine casing; and coupling a carousel with the flange members for rotation relative the flange members.

In various embodiments the method may further include installing a clamp collar onto the turbine rotor prior to installing at least one of the flange members. The coupling two spaced-apart flange members may include positioning at least one of the flange members on a periphery of the clamp collar. The coupling two spaced-apart flange members with a turbine rotor may also include positioning two spaced-apart bottom flanges between the turbine rotor and the turbine casing. In addition, in various embodiments the method may include positioning spaced-apart strong backs onto the turbine rotor, and coupling the strong backs to the respective bottom flanges.

In various embodiments the method may further include:
Coupling a lower half of a carousel 30 with bottom flanges 28;

repositioning the lower half between the rotor 14 and the first portion 16 of the turbine casing 18;

Coupling an upper half consisting of upper carousel portion 29 coupled to flanges 26 to the lower half to form tool 10.

In various embodiments the method may include supporting the tool 10 with temporary support plates 37 (FIG. 3A) prior to coupling the upper half.

In various embodiments the method may further include:
receiving positional and/or other data from a sensor wherein the sensor may include a detector coupled with one of a tool adapted for movement toward and away from the carousel and a slide coupled to and adapted for rotation with the carousel, and an indicating component (e.g. an encoded magnetic strip), coupled with the other of the tool and the slide wherein a relative movement between the sensor and the indicating component is detected by the detector; and sending positional information wirelessly to an operator readable display based on the detected relative movement. In various embodiments the detector may be magnetic, optical etc. and the indicating component may be a linear encoded strip, rotary encoder, etc.

Various embodiments may be used to machine the interior of casing for other devices, for example jet engines, compressors, and the like.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A machining apparatus comprising:
spaced-apart flange members adapted to be coupled with a turbine rotor while the rotor is in a first portion of a turbine casing;
a carousel coupled to the flange members and adapted to rotate relative to the flange members; and
an axial mover adapted to movably couple a cutting tool with the carousel;
wherein each of the flange members includes a top flange and a bottom flange, the bottom flanges being adapted to be placed between the rotor and the first portion of the turbine casing, the top flanges adapted to be fastened to the bottom flanges.

2. A machining apparatus comprising:
spaced-apart flange members adapted to be coupled with a turbine rotor while the rotor is in a first portion of a turbine casing;
a carousel coupled to the flange members and adapted to rotate relative to the flange members; and
an axial mover adapted to movably couple a cutting tool with the carousel;
wherein the carousel is adapted to rotate about a machining axis and the apparatus further comprises one or more adjustment features adapted to adjust the location of the machining axis.

11

3. The machining apparatus of claim 2, wherein the adjustment features include two or more jacking feet on at least one of the flange members and adapted to contact the rotor.

4. The machining apparatus of claim 3, wherein the two or more jacking feet are on each top flange, and further comprising two or more clamps on each bottom flange adapted to contact the rotor to help secure the apparatus to the rotor.

5. The machining apparatus of claim 1, wherein the axial mover is adapted to support a first tool holder assembly holding a first cutting tool and move the first tool assembly in an axial direction.

6. The machining apparatus of claim 5, further comprising a radial feeder adapted to move the first cutting tool radially relative to a machining axis.

7. A machining apparatus comprising:
spaced-apart flange members adapted to be coupled with a turbine rotor while the rotor is in a first portion of a turbine casing;
a carousel coupled to the flange members and adapted to rotate relative to the flange members; and
an axial mover adapted to movably couple a cutting tool with the carousel;
wherein the axial mover is coupled to a second tool holder assembly holding a second cutting tool, wherein axial movement of the axial mover moves the second cutting tool in a radial direction.

8. The machining apparatus of claim 7, wherein the second cutting tool is coupled to a first wedge member and the axial mover is coupled to a second wedge member, the first wedge member and the second wedge member being disposed such that axial movement of the second wedge member causes radial movement of the second cutting tool.

9. The machining apparatus of claim 1, wherein the axial mover includes a slide coupled to the carousel and a carriage coupled the slide such that the carriage may move axially with respect to the slide.

10. The machining apparatus of claim 9, further comprising an axial feeder having an actuating arm adapted to advance or retract the carriage axially along the slide, and wherein a trip arm is coupled with a stationary object and adapted to contact the actuating arm to effect advancement or retraction of the carriage a preselected amount with each rotation of the carousel.

11. A machining apparatus comprising:
spaced-apart flange members adapted to be coupled with a turbine rotor while the rotor is in a first portion of a turbine casing;
a carousel coupled to the flange members and adapted to rotate relative to the flange members;
an axial mover adapted to movably couple a cutting tool with the carousel; and
a sensor adapted to detect a condition of the cutting tool.

12. The machining apparatus of claim 11, further comprising:
a sending unit coupled to the sensor and disposed to rotate with the carousel, the sending unit adapted to transmit a signal representative of the condition; and
a receiving unit adapted to wirelessly receive the signal from the sending unit.

13. The machining apparatus of claim 12, wherein the receiving unit is coupled to an operator readable display and adapted to display the sensed condition of the cutting tool.

14. The machining apparatus of claim 12, wherein the condition is position of the cutting tool, and further comprising a first element adapted to hold a first cutting tool and a second element coupled with the axial mover, the first element adapted to move relative to the second element, indicia on one of the first element and/or the second element, a detector being coupled with the other of the first element and/or the second element and adapted to sense the indicia, the sensor adapted to register a relative movement between the first and second elements.

15. The machining apparatus of claim 14, wherein the indicia is a magnetic strip and/or other linear or rotary encoder.

16. A machining apparatus comprising:
spaced-apart flange members adapted to be coupled with a turbine rotor while the rotor is in a first portion of a turbine casing;
a carousel coupled to the flange members and adapted to rotate relative to the flange members;
an axial mover adapted to movably couple a cutting tool with the carousel; and
a support fixture adapted to couple with a second portion of the turbine casing, the support fixture including a cylindrical member being generally coaxial with a central axis of the second portion of the turbine casing, and wherein the spaced-apart flanges are further adapted to be coupled with the cylindrical member and support the carousel for rotation about a machining axis.

17. The machining apparatus of claim 16, further comprising one or more adjustment features adapted to be actuated by an operator to adjust the location of the machining axis.

18. The machining apparatus of claim 16, wherein the support fixture is adapted to couple with two spaced-apart mating surfaces of the second portion of the turbine casing, at least one pushing member adapted to either push the mating surfaces away from each other or push the mating surfaces toward each other.

19. The machining apparatus of claim 18, further comprising four jacking blocks generally located near corners of the support fixture, each jacking block including a first and a second of the at least one pushing members, wherein the first pushing member is adapted to push on an inner surface of the second portion of the turbine casing and the second pushing member is adapted to push on an outer surface of the second portion of the turbine casing in the general area of one of the mating surfaces to selectively shape the second portion of the turbine casing by selective adjustment of the pushing members near each of the four corners of the support fixture.

20. A machining apparatus comprising:
spaced-apart flange members adapted to be coupled with a turbine rotor while the rotor is in a first portion of a turbine casing;
a carousel coupled to the flange members and adapted to rotate relative to the flange members;
an axial mover adapted to movably couple a cutting tool with the carousel; and
a tool cartridge adapted to carry the cutting tool and couple with a tool holder assembly, the tool cartridge further adapted to couple with a gauge block that can be used to preset the height of the cutting tool within the cartridge.

21. The machining apparatus of claim 20, wherein the tool cartridge has a registration feature adapted to interface with a complementary registration feature on both the tool holder assembly and the gauge block to help ensure that the height of the cutting tool while coupled with the tool holder assembly corresponds with the height of the cutting tool measured while coupled with the gauge block.

22. A machining apparatus comprising:
spaced-apart flange members adapted to be coupled with a turbine rotor while the rotor is in a first portion of a turbine casing;

a carousel coupled to the flange members and adapted to rotate relative to the flange members about a machining axis; and an axial mover adapted to movably couple a cutting tool with the carousel; and a second axial mover mounted on the carousel adapted for rotation about the machining axis within the turbine casing, and further adapted to carry additional cutting tool assemblies.

23. A machining apparatus comprising:

a slide arranged longitudinally relative to an axis of a turbine casing, the slide adapted for rotation within at least a portion of the turbine casing;

a carriage member adapted to move along the slide; and a radial feed tool holding assembly having a first wedge member adapted to carry a tool, and a second wedge member generally co-disposed with the first wedge member and coupled with the carriage member such that an axial movement of the carriage member effects a radial movement of the tool.

24. The machining apparatus of claim 23 further comprising two spaced-apart flanges adapted to couple with a turbine rotor disposed within the turbine casing, a carousel coupled for rotation relative to the flanges, the slide coupled to the carousel.

25. The machining apparatus of claim 23 further comprising a sensor adapted to detect the radial position of the cutting tool with respect to a machining axis and wirelessly transmit a signal representative of the radial position to a receiver coupled to an output device.

26. A machining apparatus comprising:

a rotatable member adapted to be disposed for rotation within a work piece;

a tool support coupled with the rotatable member and adapted to support a tool for rotation with the rotating member;

a sensor coupled with the rotatable member and/or tool support, the sensor adapted to sense one or more operating conditions of the tool; and a sending unit coupled with the sensor adapted to receive information corresponding to the operating conditions, and further adapted to send the information wirelessly to a receiving unit coupled to a non-rotating member.

27. The machining apparatus of claim 26, wherein the receiving unit is coupled to an output device.

28. The machining apparatus of claim 27, wherein the one or more operating conditions is a radial position of the tool in relation to a rotation axis of the rotatable member.

29. The machining apparatus of claim 27, wherein the output device includes a display capable of displaying one or both of a single axis tool movement or a multiple axis tool movement.

30. The machining apparatus of claim 26, wherein the sending unit and the receiving unit are adapted to communicate via a wireless data link.

31. The machining apparatus of claim 26, wherein the rotatable member is a carousel that is journaled for rotation between two spaced-apart flanges, the flanges adapted to be secured within the work piece.

32. The machining apparatus of claim 31, wherein the work piece is a turbine casing.

33. A turbine casing machining apparatus, comprising:

a cutting tool support fixture adapted to couple with at least a portion of the turbine casing, the support fixture including a cylindrical member being generally coaxial with a central axis of the turbine casing, the cylindrical member having an outer diameter that is smaller than an inner diameter of the turbine casing;

two spaced-apart flanges adapted to couple to the cylindrical member;

a carousel coupled to the flange members and adapted to rotate relative to the flange members; and an axial mover coupled with the carousel and adapted to couple with a cutting tool;

wherein the carousel is adapted to move the cutting tool about a machining axis, and the apparatus further comprising one or more adjustment features adapted to be actuated to adjust the location of the machining axis.

34. A turbine casing machining apparatus, comprising:

a cutting tool support fixture adapted to couple with at least a portion of the turbine casing, the support fixture including a cylindrical member being generally coaxial with a central axis of the turbine casing, the cylindrical member having an outer diameter that is smaller than an inner diameter of the turbine casing;

two spaced-apart flanges adapted to couple to the cylindrical member;

a carousel coupled to the flange members and adapted to rotate relative to the flange members; and an axial mover coupled with the carousel and adapted to couple with a cutting tool;

wherein the support fixture is adapted to couple with two spaced-apart mating surfaces of the at least a portion of the turbine casing, at least one pushing member adapted to either push the mating surfaces away from each other or push the mating surfaces toward each other.

35. The machining apparatus of claim 34, further comprising four jacking blocks generally located near corners of the support fixture, each jacking block including a first and a second of the at least one pushing members, wherein the first pushing member is adapted to push on an inner surface of the turbine casing and the second pushing member is adapted to push on an outer surface of the turbine casing to selectively shape the turbine casing by selective adjustment of the pushing members.

36. The machining apparatus of claim 1, further comprising:

a sensor adapted to detect a condition of the cutting tool;

a sending unit coupled to the sensor and disposed to rotate with the carousel, the sending unit adapted to transmit a signal representative of the condition; and a receiving unit adapted to wirelessly receive the signal from the sending unit;

wherein the receiving unit is coupled to an operator readable display and adapted to display the sensed condition of the cutting tool.

37. The machining apparatus of claim 2, further comprising:

a sensor adapted to detect a condition of the cutting tool;

a sending unit coupled to the sensor and disposed to rotate with the carousel, the sending unit adapted to transmit a signal representative of the condition; and a receiving unit adapted to wirelessly receive the signal from the sending unit;

wherein the receiving unit is coupled to an operator readable display and adapted to display the sensed condition of the cutting tool.

38. The machining apparatus of claim 16, further comprising:

a sensor adapted to detect a condition of the cutting tool;

a sending unit coupled to the sensor and disposed to rotate with the carousel, the sending unit adapted to transmit a signal representative of the condition; and a receiving unit adapted to wirelessly receive the signal from the sending unit;
wherein the receiving unit is coupled to an operator readable display and adapted to display the sensed condition of the cutting tool.

39. The machining apparatus of claim 1, wherein the axial mover includes a slide and/or a carriage.

* * * * *